C. K. MELLINGER & J. W. ANDERSON.
Jump Seat for Vehicles.
No. 231,438.              Patented Aug. 24, 1880.
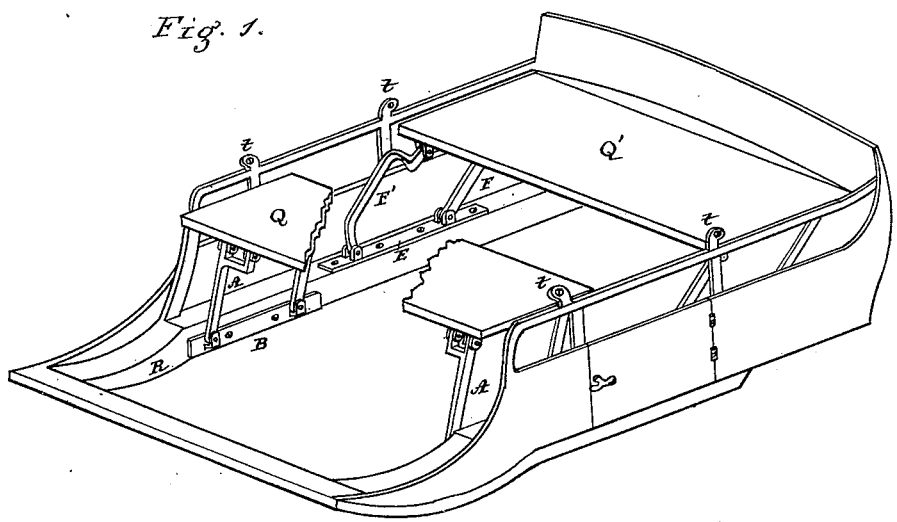
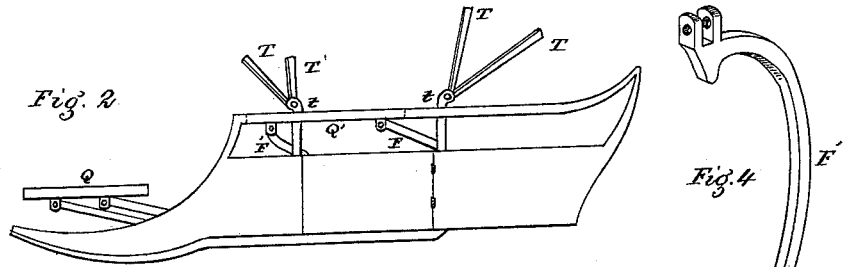
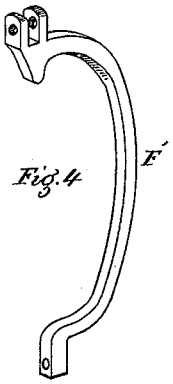
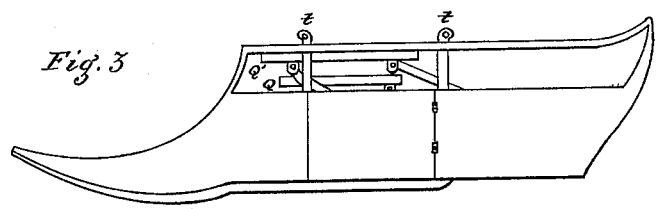
WITNESSES·                     INVENTORS·

UNITED STATES PATENT OFFICE.

CHRISTIAN K. MELLINGER AND JOHN W. ANDERSON, OF LANCASTER, PA.

JUMP-SEAT FOR VEHICLES.

SPECIFICATION forming part of Letters Patent No. 231,438, dated August 24, 1880.

Application filed February 12, 1880.

*To all whom it may concern:*

Be it known that we, CHRISTIAN K. MELLINGER and JOHN W. ANDERSON, of the city of Lancaster, in the State of Pennsylvania, have jointly invented certain Improvements in Jump-Seat Irons for Vehicles, of which the following is a specification.

The object of this improvement on Patent No. 207,539, dated August 27, 1878, issued to C. K. Mellinger and J. W. Anderson, the above-named parties, is to meet a want in providing jump-seats for vehicles having swelled bodies, such as extension-top phaetons or the like, in such a manner that both seats may be made of equal length. To meet this demand we have invented the improvement herein set forth.

The accompanying drawings illustrate the application and construction of said improvement, showing the seats in various positions in the ordinary body of a phaeton.

Figure 1 is a perspective view of the frame or sill and sides of a vehicle with top removed, both seats being shown in position, with a portion of the front seat broken away to show the sill-plate and improved leg to the back seat. Fig. 2 shows the front seat thrown forward and low down and the hind seat thrown forward and in position. Fig. 3 shows the front seat thrown back and the hind seat thrown forward over the front seat, both seats being of equal length. Fig. 4 illustrates the construction and extensive curve in the iron or front leg of the hind seat, as the means for accomplishing the desired improvement.

It will be seen in the patent hereinbefore referred to that the socket-joints therein mentioned are set on opposite sides of the sill-plates and the lower extremities of the legs F F' are correspondingly bent. The object of this staggered arrangement is twofold: first, to stiffly establish the rear seat, Q', upon its legs to resist lateral displacement; secondly, to set the front legs, F, apart as widely as possible to pass as long a front seat, Q, between them as possible, thus avoiding the objection often urged against the short seat in jump-seat wagons. It practically failed in its object. Carriage-makers desire seats of equal length. To remedy this defect we now set the legs in a line on the sill-plate, instead of staggering them, and curve the front legs of the hind seat in such a manner that when the front seat is thrown back the hind seat can be thrown forward over it, while both seats are of equal length.

This arrangement is equally strong, neat, and applicable to various kinds of vehicles, meeting the approbation of carriage-makers generally. Otherwise the appliances to the seats are the same as set forth in the patent referred to and therein claimed. We therefore deem it needless to specify those features; but the claim therein and specification do not describe nor protect us in the change made, slight as it may seem. In view of the important results obtained we deem it substantially different.

We are not aware that jump-seats of equal length have ever before been used. We are aware that hinged end flaps have been used so as to fold in upon the seat, making it necessary to raise the cushions before these flaps could be turned over. The object—so greatly desired—to have both the seats of the same length is hereby accomplished. Therefore

What we claim, or desire to secure by this improvement, is—

The front pair of curved supporting irons or legs, F', of the hind seat, Q', which allows the hind seat to fold over the front seat, Q, when both seats are of equal length, substantially constructed as shown, for the purpose set forth.

CHRISTIAN K. MELLINGER.
JOHN W. ANDERSON.

Witnesses:
W. B. WILEY,
JACOB STAUFFER.